(No Model.) 10 Sheets—Sheet 6.

F. A. PRATT.
GEAR CUTTING MACHINE.

No. 301,270. Patented July 1, 1884.

Witnesses;
Geo Hays
H. W. Faulkner.

Inventor;
Francis A. Pratt,
Per F. H. Richards
Attorney.

(No Model.) 10 Sheets—Sheet 7.

F. A. PRATT
GEAR CUTTING MACHINE.

No. 301,270. Patented July 1, 1884.

Witnesses;
Geo Hays
H. W. Faulkner.

Inventor;
Francis A. Pratt.
Per F. H. Richards,
Attorney.

(No Model.)

F. A. PRATT.

GEAR CUTTING MACHINE.

No. 301,270.    Patented July 1, 1884.

Witnesses:
Geo Hays
H. W. Faulkner.

Inventor:
Francis A. Pratt,
Per F. H. Richards,
Attorney.

(No Model.) 10 Sheets—Sheet 9.

F. A. PRATT.
GEAR CUTTING MACHINE.

No. 301,270. Patented July 1, 1884.

Witnesses;
Geo. Hays
H. W. Faulkner.

Inventor;
Francis A. Pratt
Per F. H. Richards, Attorney.

(No Model.) 10 Sheets—Sheet 10.

F. A. PRATT.
GEAR CUTTING MACHINE.

No. 301,270. Patented July 1, 1884.

Witnesses;
Geo Hays
H. W. Faulkner.

Inventor;
Francis A. Pratt,
Per F. H. Richards,
Attorney.

UNITED STATES PATENT OFFICE.

FRANCIS A. PRATT, OF HARTFORD, CONNECTICUT.

GEAR-CUTTING MACHINE.

SPECIFICATION forming part of Letters Patent No. 301,270, dated July 1, 1884.

Application filed November 5, 1883. (No model.)

*To all whom it may concern:*

Be it known that I, FRANCIS A. PRATT, a citizen of the United States, residing at Hartford, in the county of Hartford and State of Connecticut, have invented certain new and useful Improvements in Gear-Cutting Machines, of which the following is a specification, reference being had to the accompanying drawings.

My invention relates to machinery for the manufacture of spur-wheels and of worm-wheels, and has for its object to provide for the making, from suitable blanks, of either of said kinds of wheels by means of the same machine.

It consists in an organized machine, in the mechanisms organized into the said machine, and in particular combinations contained in the said mechanisms.

My organized machine for cutting spur-wheels and for cutting worm-wheels consists, essentially, of two principal and five auxiliary mechanisms. The principal ones are the blank-carrying and the cutter-carrying mechanisms. The auxiliary ones are the cutter-rotating, cutter-traversing, blank-spacing, blank-rotating, and blank-feeding mechanisms. These several mechanisms, in order that they may collectively perform their function of operating upon either of the above-specified kinds of wheels, should be constructed and situated relatively to each other substantially as shown and hereinafter described; but it is not essential that they should have, as a machine, any particular position relative to a vertical or horizontal plane. Thus the blank-carrying arbor may be situated in a vertical position, in a horizontal position, and arranged to be traversed vertically above (or below) the cutter-carrying arbor, or in a horizontal position, and arranged to be traversed in a horizontal plane toward or from a vertical cutter-carrying arbor—or the latter traversed toward or from it, as the case may be—these three systems of arrangement of that arbor being already embodied in well-known forms of gear-cutting machines. The frame-work to support the operative parts of the machine in either of those cases may be designed in a variety of forms; but these forms constitute no part of my present invention. I have, however, preferred the latter system of arrangement described in selecting the style in which to construct a machine embodying my invention, more on account of the general convenience that, in my opinion, is thereby secured in operating the machine than for any other advantages which that style has over other styles for illustrating the said invention.

I will now describe in detail the construction of such a machine and the several mechanisms thereof embodying my invention, in which the blank-carrying arbor is situated and arranged to be traversed in a horizontal plane, and in which the cutter-carrying arbor is similarly situated and arranged relative to a vertical plane, the latter being traversed in a direction at right angles to the former.

Referring to the drawings, Figures 1 to 12, both inclusive, illustrate such a machine, of which

The frame-work for supporting the several mechanisms of the machine in their respective positions consists in the present instance of the following parts: a horizontal bed, A, resting upon suitable supports, and having upon its front side at its rear end a horizontal extension transversely thereof, (see Figs. 1, 2, and 3,) a supplementary frame-work, B, and the bearing-pieces G, F, F⁴, and F⁵. Upon the upper outside corners of bed A, from the front end thereof to the frame B, are formed any suitable ways, (see Fig. 2,) upon which the carriage E of the blank-carrying mechanism is fitted to travel. Upon similar ways, B⁷, on frame B (see Fig. 4) the carriage C of the cutter-carrying mechanism is similarly fitted to traverse the machine. In the frame B are also formed bearings for parts of the auxiliary cutter-traversing mechanism. In the pieces G and F are suitably-formed bearings for the shaft I of the auxiliary cutter-rotating mechanism, which is also the principal driving-shaft of the machine, and in the pieces F, F⁴, and F⁵ and in bed A are similar bearings for the auxiliary blank-rotating and blank-feeding mechanisms. The auxiliary blank-spacing mechanism is carried upon the carriage of the blank-carrying mechanism, as hereinafter described.

I prefer to construct the frame-work in several parts, as described, to facilitate the manufacture, adjustment, and repair of the same; but it may be formed integral or of a different arrangement of parts, as may be preferred.

Figure 6:
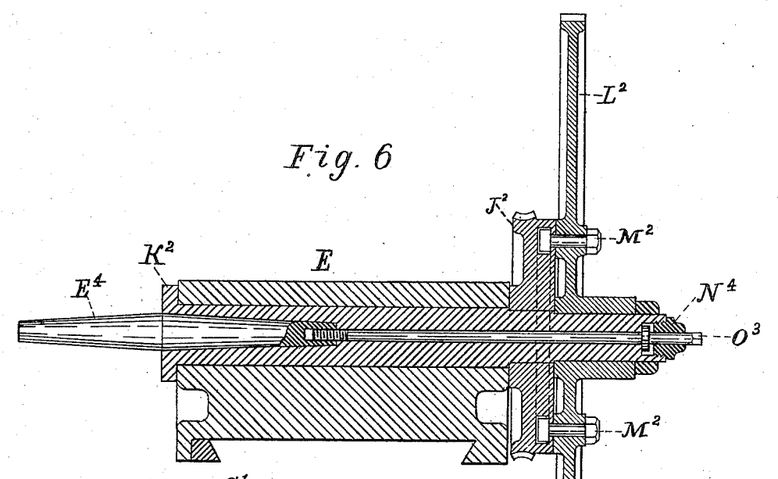
Fig. 6 is a vertical section in line $xx$ of Fig. 1 of the blank-carrying mechanism.
Figure 13:
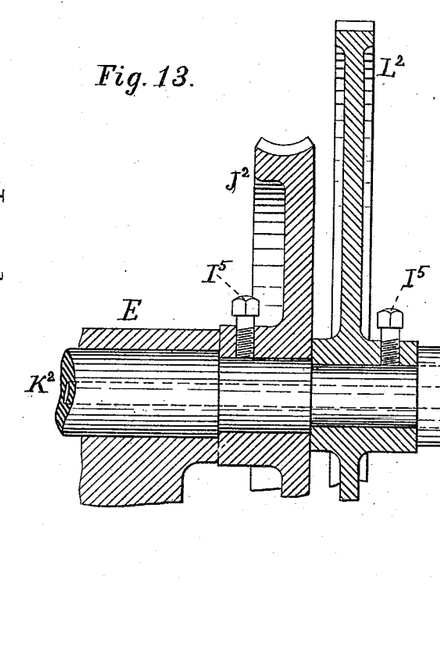
Figs. 13 to 22, both inclusive, show modifications, as hereinafter described, of various portions of the mechanisms shown in the preceding figures.
Figure 16:
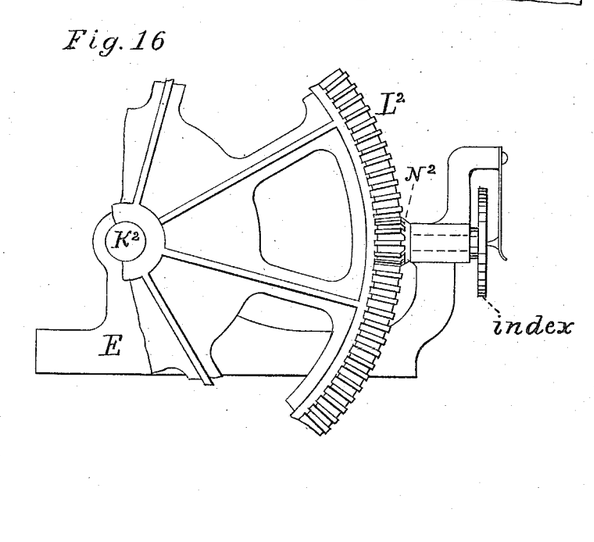
Figures 17, 20, 22:
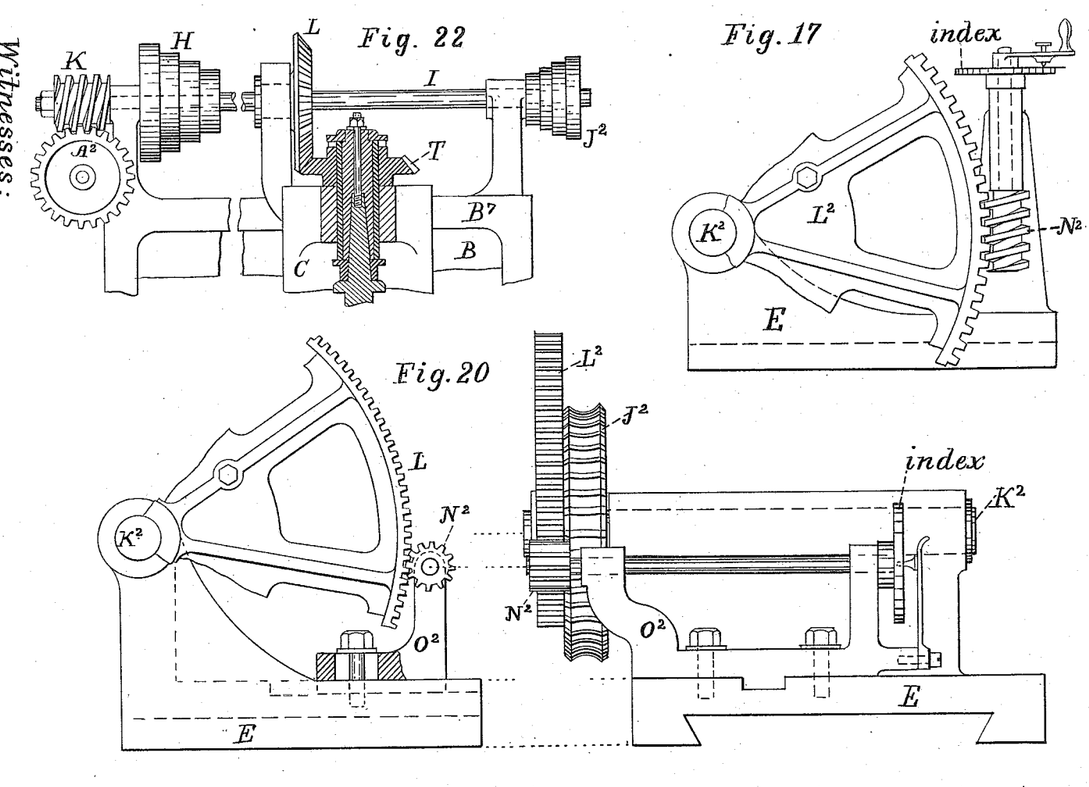
Figure 18:
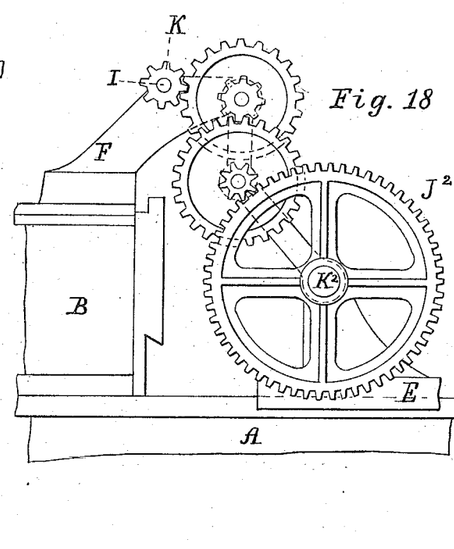
Figure 19:
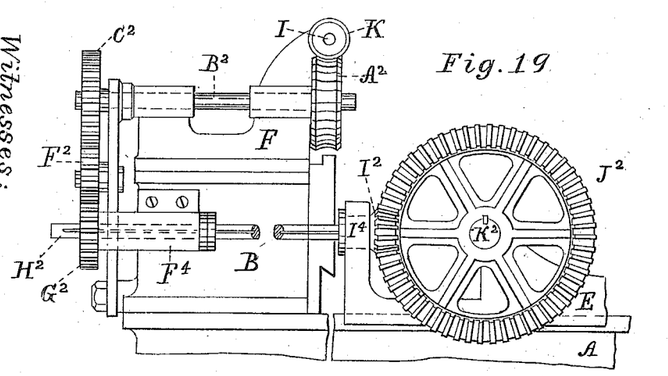

The blank-carrying mechanism consists of the following: A carriage, as E, is fitted, substantially as shown, to travel longitudinally upon the bed A, and to receive the blank-carrying arbor K², which is preferably formed hollow to receive and have secured therein the usual spindle, as E⁴, for sustaining the blank in a fixed position relative to said arbor. That blank-spindle (see Fig. 6) is secured in the blank-arbor by means of a screw, O³, which, by means of the nut N⁴, making a bearing for the same, is also adapted to force the said spindle out of said arbor when turned in the proper direction therefor. Upon the blank-carrying arbor are placed two master-wheels, as L² and J², which may both be fixed thereon, or of which one, as L², may be so fixed, and the other, as J², fixable to that; or both may be fitted to revolve thereon, and be separately fixable thereto by means of any suitable binding devices—as, for instance, set-screws, as I⁵ I⁵, Fig. 13. In the first case some such device as a set-screw or a key—preferably the latter, or both—may be used to fix both of the said wheels to said arbor, in the usual manner of fixing such wheels. In the second case any suitable binding device—such as a pin, key, or screw, &c.—may be used to fix the said fixable wheel directly to the blank-arbor; or the same result may be accomplished indirectly by fixing that wheel to the adjoining master-wheel that is already fixed to that arbor by means of suitable holding devices—as, for instance, one or more bolts, as M². One of the master-wheels, in this instance the first named, L², is adapted by means of some suitable auxiliary mechanism, as hereinafter described, to be used to rotate the blank-carrying arbor intermittently for the purpose of spacing spur-wheel blanks in the interval of time between the operations of cutting their successive teeth. The other master-wheel, in this instance J², is similarly adapted, by means of some suitable auxiliary mechanism, as hereinafter described, to be used to revolve that arbor continuously for the purpose of revolving worm-wheel blanks during the operation of cutting teeth in the same by means of a hob of the usual description. I prefer that the master-wheel L² should be a spur-wheel, and that the master-wheel J² should be a worm-wheel, as shown in the several elevations of my present machine; but that is not essential to all of my claims, as will appear more clearly by referring to Figs. 16 and 17, showing, respectively, a bevel-wheel and a worm-wheel for L², and to Figs. 18 and 19, showing, respectively, a spur-wheel and a bevel-wheel for J². I prefer a worm-wheel for the master-wheel J², chiefly for the reason that the pinion, being then a worm-pinion, may be located in the most convenient position therefor below that master-wheel, (see Fig. 4,) and also arranged to slide upon the slotted shaft H², whereby it is rotated by means of the bearing I⁴, secured to carriage E. By this construction the sliding of the carriage E toward or from the cutter-arbor does not rotate the blank-arbor at all, as it would do if a train of spur-gearing carried upon jointed links were used to drive the said blank-arbor, as shown, for instance, in Fig. 18.

Figure 1:
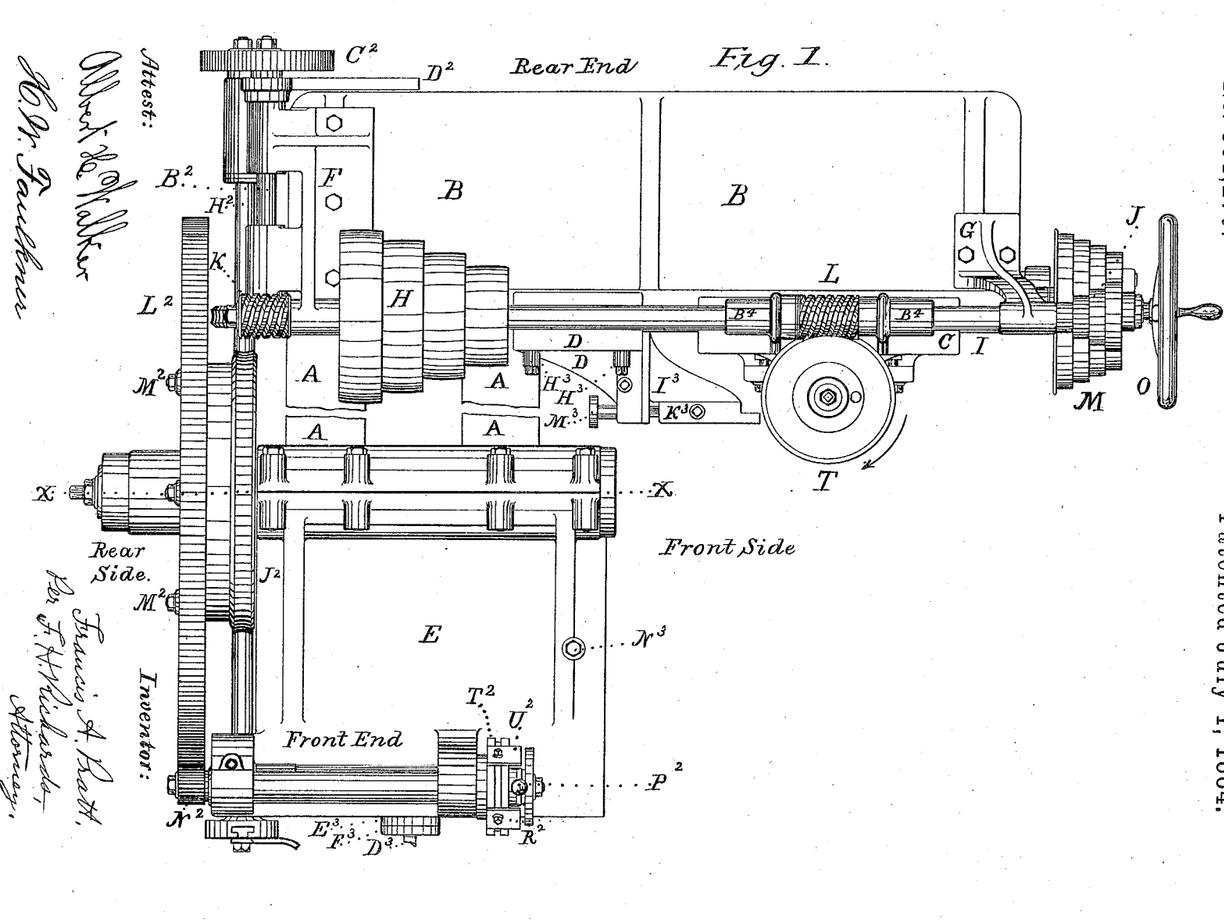
Fig. 1 is a plan view wherein a central portion of the bed A is removed to reduce the space required for the illustration.
Figure 2:
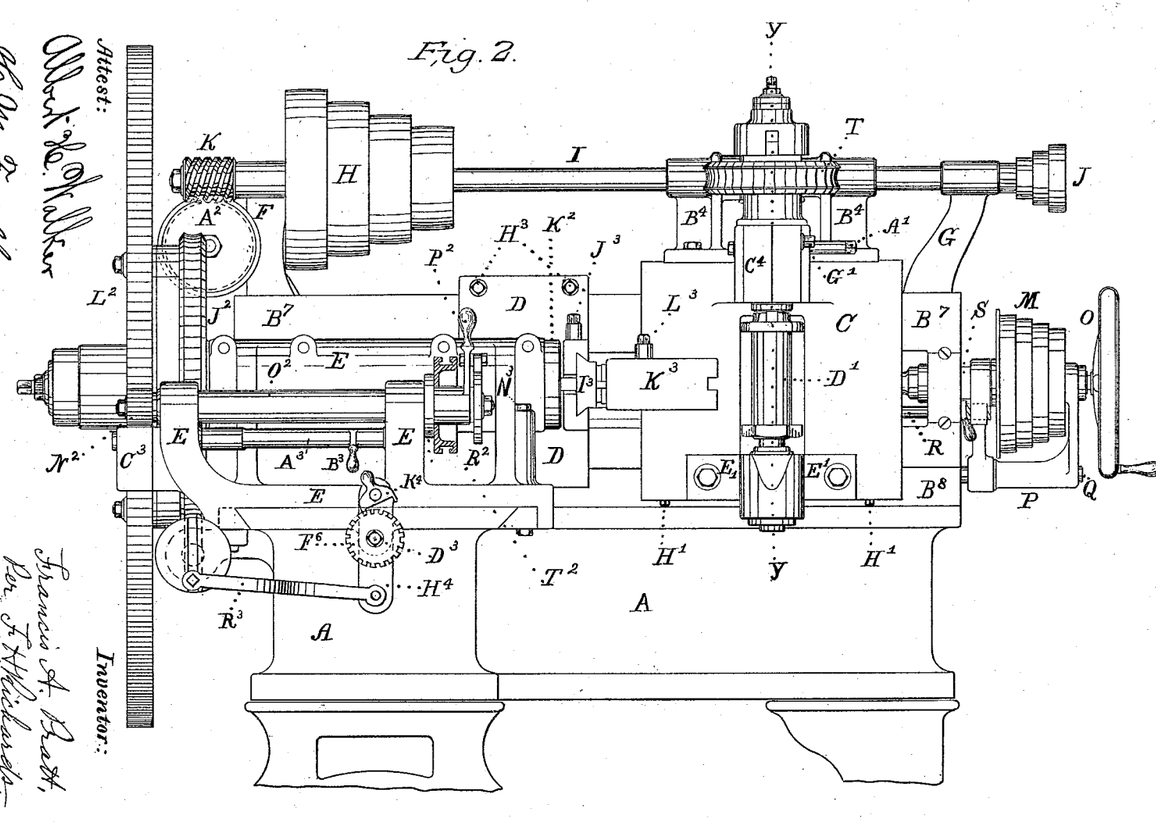
Fig. 2 is an elevation of the front end.
Figure 3:
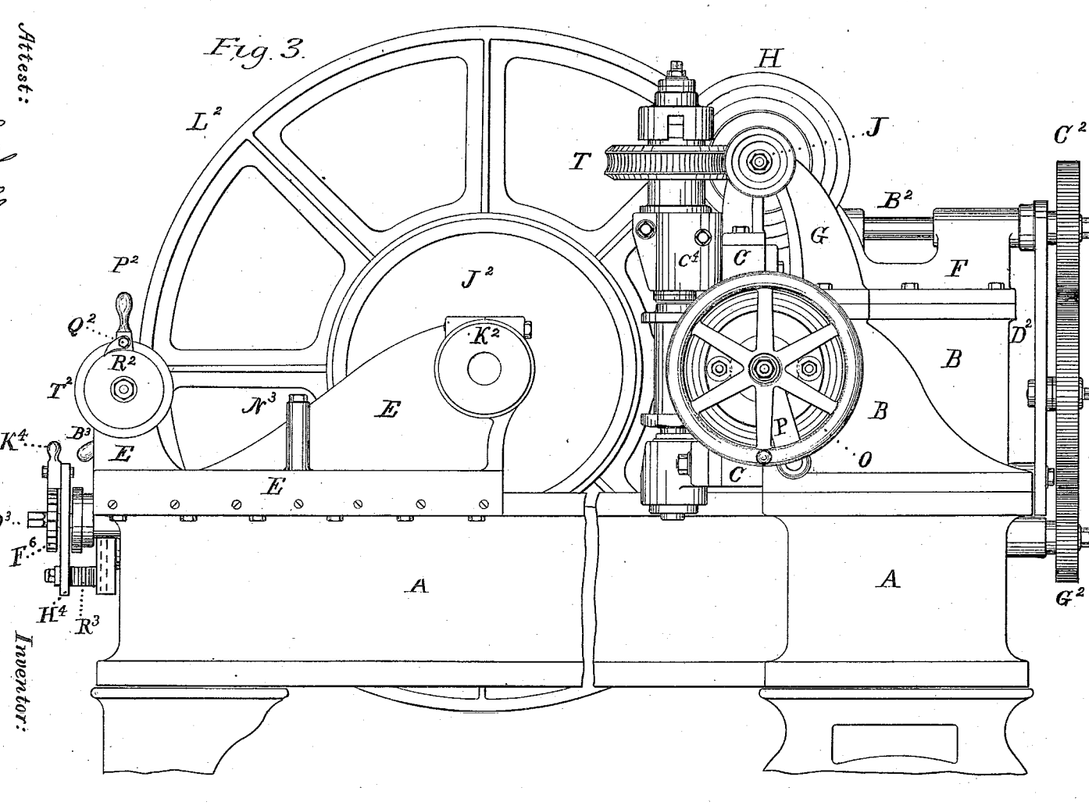
Fig. 3 is an elevation of the front side.

The blank-spacing mechanism for use in cutting spur-wheels consists of the following: A pinion, N², is mounted upon a shaft, as shown in Figs. 1 and 2, and fitted to revolve in gear with the master-wheel L². That pinion-shaft is fitted to revolve in bearings formed eccentrically in a sleeve, O², which is supported by suitable brackets on carriage E, in which it is adapted to be revolved or clamped, as required. When the machine is used for cutting worm-wheels, that sleeve is preferably revolved so as to carry the pinion N² out of gear with the master-wheel L², so that the said pinion and its shaft need not revolve during that operation, thereby avoiding any unnecessary wear of those parts. On sleeve O² at its front end is formed or secured a stop-wheel, T², having means for adjustably securing thereto a pair of stops, U², the said means being in the present instance an inverted-T slot formed in the external cylindrical surface of said stop-wheel, and bolts fitted therein and extending outward through the stops, as shown. In front of said stop-wheel a hand-lever, P², is fitted to oscillate upon the pinon-shaft between said adjustable stops U². Upon the pinion-shaft in front of that hand-lever is fixed a ratchet-wheel, R², which is rotated intermittently by means of the pawl Q² on the hand-lever. The ratchet-wheel R² is usually one of a series of such wheels which are provided with the machine, each having a different number of divisions, so that by selecting for use a properly-divided ratchet-wheel and properly setting the stops U²—having due regard to the relative proportions of pinion N² and master-wheel L²—any required degree of rotation may be given to blank-arbor K², and that operation repeated intermittently, as required. That operation I have referred to herein as that of "blank-spacing," and it is in general similar to the same operation as performed heretofore in other gear-cutting machines.

I do not limit myself to the described sleeve $O^2$, for the purpose of carrying the pinion $N^2$ into and out of gear with the master-wheel $L^2$, as other devices may be used for that purpose. In Fig. 20 one such other device that I have so used is shown in two views, in which the pinion-shaft is mounted upon a slide, $O^2$, which is carried upon carriage E. The operation of that slide to perform the same operation as the said sleeve is obvious.

For the purpose of rotating the pinion $N^2$ I prefer the apparatus described, consisting of the parts $P^2$, $Q^2$, $R^2$, $U^2$, and $T^2$; but various arrangements of the ordinary index and pin may be used in place thereof, if preferred—as, for instance, the arrangements shown in Figs. 16 and 20.

For the purpose of securely holding the blank from rotation during the cutting operations, there is provided a clamp, $C^3$, adapted to be operated by means of lever $B^3$, shaft $A^3$, and a screw, $C^5$, between said shaft and said clamp, whereby the rim of master-wheel $L^2$ may be firmly held between said clamp and a corresponding surface on carriage E. That clamp is of course loosened whenever it is required to rotate the master-wheel $L^2$, either intermittently or continuously. I do not limit myself to any particularly position of this blank-spacing mechanism in the machine, nor to any particular kind of pinion $N^2$ in said mechanism, for that is only required to conform to the character of the master-wheel $L^2$, with which it gears. When that master-wheel is a spur-wheel, the said pinion should obviously be a spur-pinion, as shown and hereinbefore described; but if that wheel is a bevel-wheel, as shown in Fig. 16, the pinion should correspond therewith, as also shown in that figure; and if said wheel is a worm-wheel, the pinion should be a worm-pinion adapted to gear therewith, as shown in Fig. 17.

Figure 4:
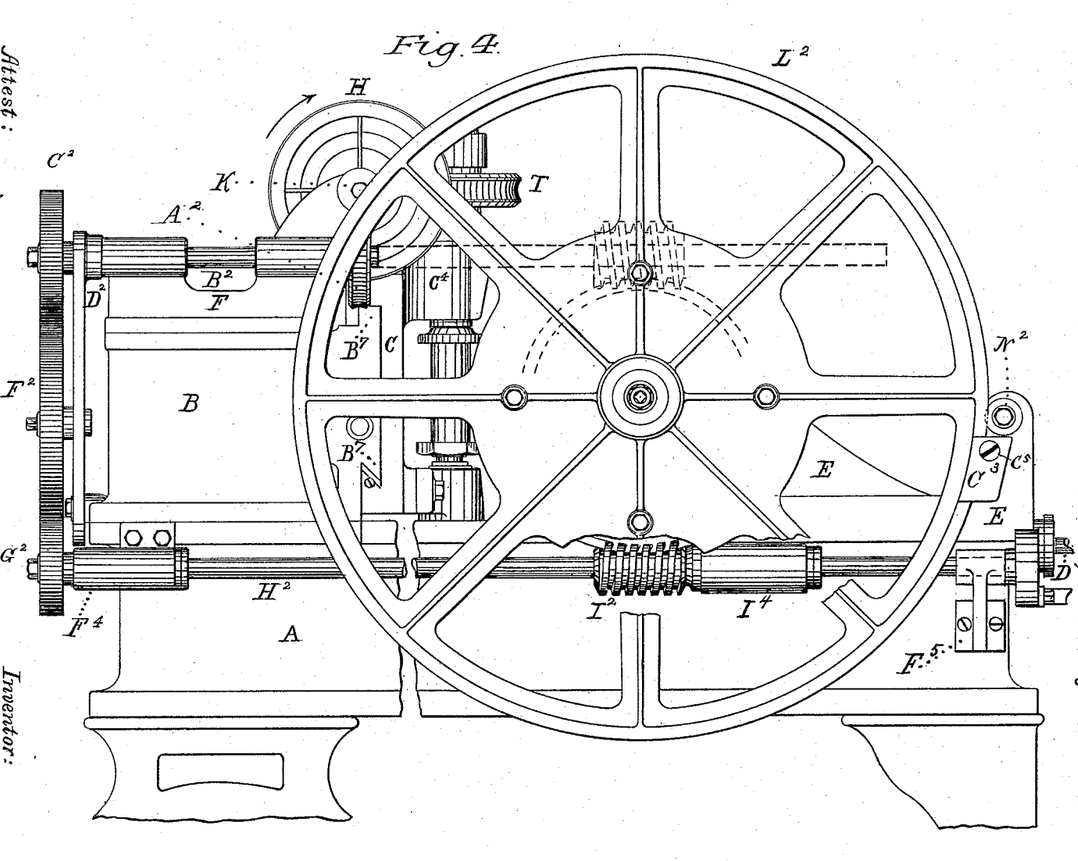
Fig. 4 is an elevation of the rear side.
Figure 5:
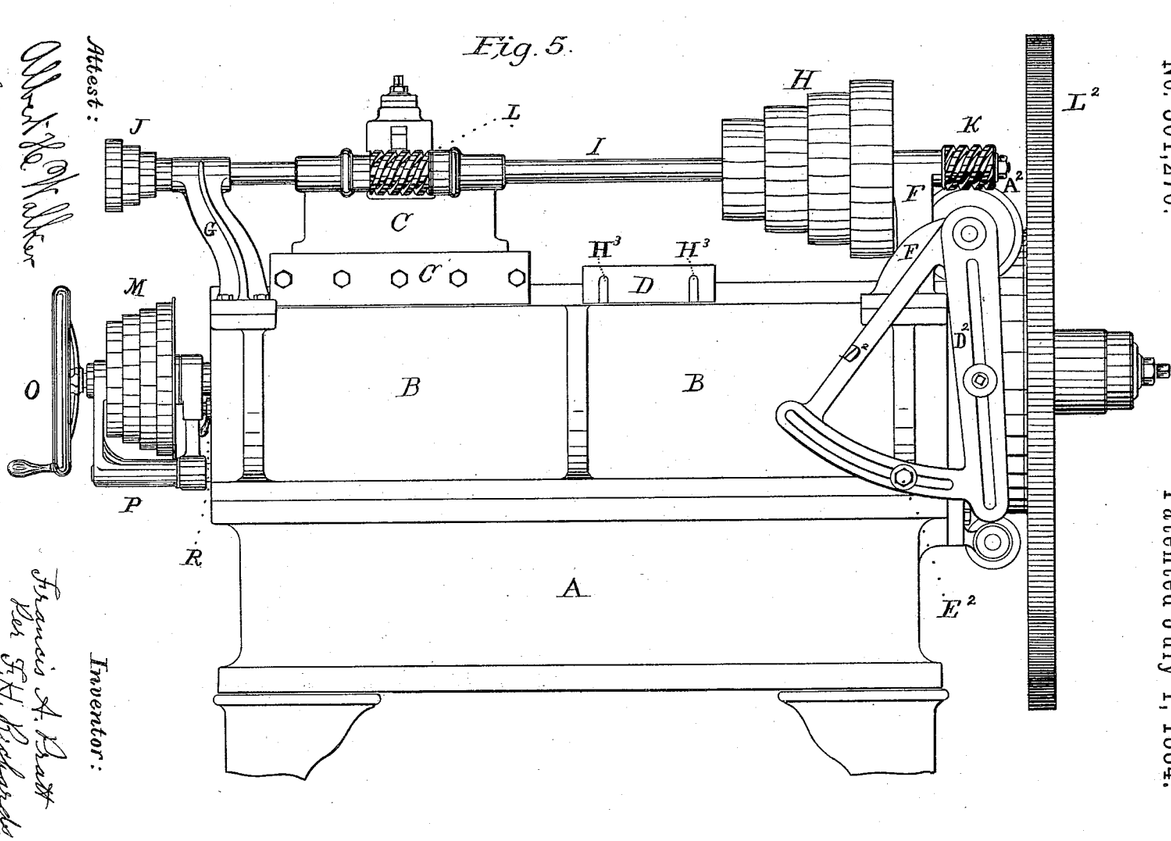
Fig. 5 is an elevation of the rear end.

The blank-rotating mechanism for use in the making of worm-wheels from suitable blanks by means of corresponding hobs consists of the following: Supported in the bearings $F^4$ and $F^5$, and parallel to the ways of bed A, is a shaft, $H^2$, which is incidentally further supported by a bearing, $I^4$, which is attached to carriage E, for the purpose of receiving a tubular extension of the worm-pinion $I^2$. That worm-pinion is splined to said shaft $H^2$, and made to travel over the same in a fixed relation to carriage E, when that is moved on the bed A, by means of a shoulder at the left hand and nuts at the right hand of bearing $I^4$, as seen in Fig. 4, and is constructed to gear with the master-wheel $J^2$. The main driving-shaft of the machine I carries a worm-pinion, K, gearing with a worm-wheel, $A^2$, which is carried upon an intermediate shaft, $B^2$. This shaft is parallel to shaft $H^2$, and from it the latter is driven by means of a train of gearing consisting of driving-gear $C^2$ on shaft $B^2$, intermediate gear, $F^2$, carried upon the oscillating slotted yoke $D^2$—or any other suitable adjustable support—and the driven gear $G^2$ on shaft $H^2$. A different number of gears may be used in this train of gearing to reverse the direction of the motion of shaft $H^2$, or otherwise, as required. The gears $C^2$ and $G^2$ are constructed of such relative proportions—having due regard to the other wheels and pinions of the machine, to the pitch of the hob, and to the size of the worm-wheel blank being operated upon—as will produce the velocity of rotation of blank-arbor $K^2$ required for the proper cutting of the blank by the hob.

The principal object of having in this auxiliary mechanism of my machine the two shafts $B^2$ and $H^2$ in the relation described is to permit the use of a train of gearing between them of simple construction and convenient arrangement, the individual gears comprising the train being usually selected from a series of such gears, each of a different size, provided for that purpose. In that case the worm-wheel $A^2$ and worm-pinion K are permanent parts of the machine.

I do not limit myself to spur change wheels for transmitting motion from shaft $B^2$ to shaft $H^2$. One other device adapted to be used in place of gears $G^2$ and $C^2$ is a pair of sprocket-wheels and a suitable drive-chain running over them, the said wheels being changed to correspond with any change of speed required. Neither do I limit myself to worm-gearing between shafts I and $B^2$, as bevel-gearing may be so used, if the latter shaft is suitably located therefor.

Another way to communicate rotary motion from shaft I to master-wheel $J^2$ is to extend shaft $B^2$ toward the right hand, as shown by dotted lines in Fig. 4, so that the worm $I^2$ is above that master-wheel, and the bearing $I^4$ extends upward instead of downward from the carriage E. In that case, to change the velocity of rotation of said master-wheel $J^2$, the worm-wheel $A^2$ and pinion K may be changed for a pair having a different relation to each other. In my claims, in which this auxiliary blank-rotating mechanism as a whole or in part forms an element of the combination claimed, I do not limit myself to the construction hereinbefore described; but I may use in lieu thereof any machinery of transmission adapted to transmit rotary motion from shaft I—or if that be absent from the machine, then from the cutter-carrying arbor—to the master-wheel $J^2$. One such other construction referred to is shown in Fig. 18, in which the shaft I is geared to the master-wheel $J^2$ by a train of spur-wheels, the said master-wheel being also a spur-wheel. Another such arrangement of gearing is shown in Fig. 19, in which the master-wheel $J^2$ is a bevel-wheel driven by a bevel-pinion, $I^2$, similarly as the worm-pinion $I^2$, Fig. 4, drives the master worm-wheel in that figure. In this case, Fig. 19, the shaft $H^2$ is preferably splined to slide through the gear-wheel $G^2$ and fixed in pinion $I^2$.

The blank-feeding mechanism for use more especially in conjunction with the blank-rotating mechanism to feed a worm-wheel blank to the action of the hob consists as follows: In a suitable bearing formed in the bed A a feed-screw, $D^3$, is fitted to revolve, the thread of which works in a nut (not shown) attached in the usual way to the under side of carriage E. The extreme outer end of that screw is formed to receive a crank, wrench, or other appliance for the purpose of turning the same by hand. Next to this crank-receiving portion of $D^3$ is affixed a ratchet-wheel, $F^6$, and next to that a lever, $H^4$, is fitted to oscillate on said screw. (See Figs. 2 and 3.) This lever carries a pawl, $K^4$, which operates the ratchet-wheel to turn the screw $D^3$, and thereby feed the carriage E; and it is preferably made double-pointed, so that it may be used to turn said screw in either direction, accordingly as one or the other of the points thereof is made to engage with said ratchet-wheel. The shaft $H^2$ extends through bearing $F^5$, and carries upon its outer end a crank—or, if that gives a too rapid feed motion, a sun-and-planet motion or some equivalent speed-reducing device—having an adjustable crank-pin, which is connected to the lever $H^4$ by means of a rod, $R^3$. By this arrangement the rotation of $H^2$ acts through the crank-pin, rod $R^3$, lever $H^4$, pawl $K^4$, ratchet-wheel $F^6$, and screw $D^3$ to feed the blank, as it revolves, to the cutting-hob, the required amount of feed being obtained by a corresponding adjustment of the crank-radius. On the screw $D^3$, outside of bed A, is placed a suitably-graduated wheel, $E^3$, which is fitted to revolve freely thereon, and adapted to be clamped thereto by means of a nut, $F^3$. This nut acts to force said wheel against a shoulder (not shown) and said screw, thereby clamping them together in the usual manner. By taking one of the graduations on $E^3$ as a zero-mark, bringing it to a corresponding reference mark or pointer on bed A, and then fixing said wheel to $D^3$ by means of the nut $F^3$ or its equivalent, the advance of carriage E on its ways may be read on the said wheel. The operation of this feeding mechanism, when constructed as thus described, is intermittent; but it may be made to feed continuously by connecting a gear in place of $F^6$ to shaft $H^2$ by means of a train of spur or other gearing, substantially as now sometimes practiced in milling-machine construction.

Figure 7:
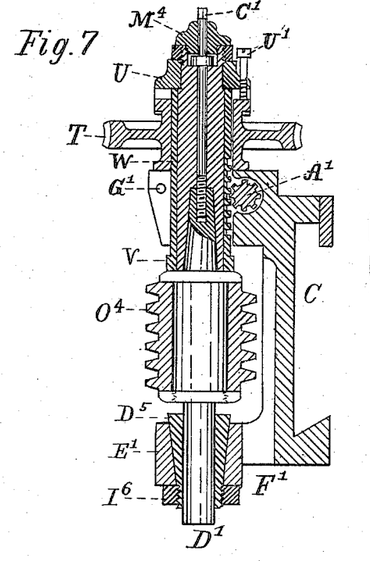
Fig. 7 is a vertical section in line $y\, y$, Fig. 2, of the cutter-carrying mechanism.
Figure 21:
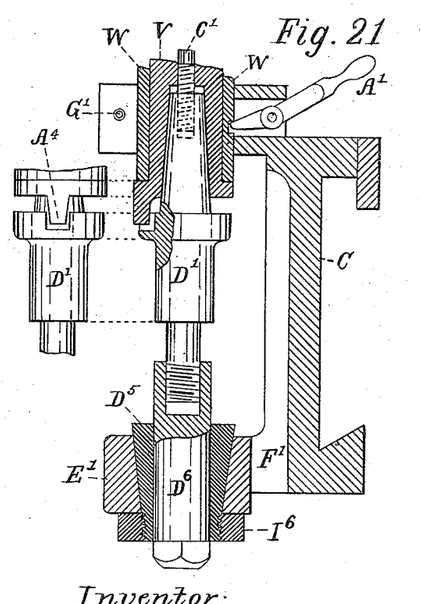

The cutter-carrying mechanism consists as follows: The carriage C, which is fitted to traverse the machine on ways $B^7$ of the frame B, has a fixed projection at its upper edge, and a removable bearing, $E'$, adjustably secured to its lower edge. Between $E'$ and C is a channel, $F'$, for the escape of chips. The projection $C^4$ is formed to receive a vertical slide, W, within which the cutter-arbor V is fitted to revolve, the collar U being fixed upon said arbor above the said slide to hold it in place. The external form of that slide is not essential so long as it conforms to the requirements of the parts supporting and carried by it. In the present instance, owing, chiefly, to the form of gearing used to rotate the cutter-arbor, and to provide a convenient bearing for the worm-wheel T, I have shown said slide formed cylindrical—also of a uniform thickness—throughout its length. The projection $C^4$ is bored to receive the slide W, a pinion, $A'$, (see Figs. 2 and 7,) and a binding-screw, $G'$, or other clamping device—such as a cam or wedge—equivalent thereto. By means of that binding-screw the two parts of the said projection—which is made two-parted by a vertical slit across the front thereof—are clamped upon slide W, to hold the same in place. When said binding-screw is loosened, the slide may then be moved up or down by means of a wrench applied to the stem of pinion $A'$, for the purpose of adjusting the cutter to the required position relative to a blank (not shown) carried by arbor $K^2$. The pinion $A'$ is more a matter of convenience than of necessity—as the adjustment of slide W may be effected by hand, if required—and it may be replaced by a lever, wedge, or cam with equal effect, the part C being in that case made suitably therefor. One such equivalent for $A'$ in Fig. 7 is shown in Fig. 21, where a lever, $A'$, is shown in place of said pinion. The cutter-arbor V is either formed to extend downward to carry the cutter and pass into bearing $E'$, or preferably, as shown in Fig. 7, it is formed in two parts, of which the upper one is formed hollow to receive the lower part, which is denominated herein as the "cutter-spindle $D'$". This cutter-spindle has at its lower end a cylindrical journal adapted to revolve in said bearing $E'$, and an opening formed to receive the projection $A^4$, which is formed on arbor V, (see Fig. 21,) whereby the latter rotates said spindle positively. When the arbor V is formed in two parts, as described, the spindle $D'$ is secured to said arbor by means of a screw, $C'$, which operates for that purpose, similarly as the screw $O^3$ does in the blank-arbor $K^2$, hereinbefore referred to. A nut, $M^4$, above a collar formed on screw $C'$, enables that screw, when turned in the proper direction therefor, to force the spindle $D'$ out of arbor V, similarly as the nut $N^4$ operates upon the blank-carrying spindle hereinbefore referred to. The bearing $E'$ is bored tapering, largest at the top, to receive a correspondingly-tapered bushing, $D^5$, that forms the bearing-surface for the journal of $D'$, and which is made diametrically adjustable by means of a slit in one side thereof. A nut, $I^6$, on its lower end serves to compress the said bushing by drawing it into the said bearing $E'$.

By the described construction of the cutter-arbor and adjacent parts the adjustment of the cutter is quickly effected by means of the pinion $A'$ or its equivalent without the necessity of adjusting the lower bearing, $E'$, of that arbor. The spindle D' is sometimes made, as shown in Fig. 21, in two parts, the lower part, D⁶, forming a nut to hold the cutter onto the upper part, as well as the journal to run in bushing D⁵.

The cutter-rotating mechanism consists of the following: In bearings formed in the pieces G and F is the shaft I, parallel to the ways B⁷, and having a pulley, H, by means of which it is rotated, and a worm-pinion, L, splined thereto, for driving the cutter-arbor. That shaft is further supported by bearings formed in a bifurcated bracket, B⁴, on carriage C, the two ends of which inclose the worm-pinion L. This pinion gears with the worm-wheel T, which has its bearing upon the slide W, hereinbefore referred to, of the cutter-carrying mechanism, and which is slid upon the shaft I by the bracket B⁴ when the carriage C is traversed on its ways. On the upper end of the hub of worm-wheel T are formed clutch-teeth engaging with similar teeth projecting downward from collar U, of sufficient length to allow a proper vertical adjustment of the cutter-arbor and slide W without disengaging them. When that slide is not at its lowest point, a screw, U', is used to prevent the worm-wheel from being lifted from its normal position, in which it rests on projection C⁴. The shaft I is also in my present machine the principal driving-shaft, and carries, besides pulley H and worm-pinion L, the worm-pinion K, hereinbefore referred to, and the pulley J, to be hereinafter referred to. As thus described, the driving-shaft I is rearward of the cutter-arbor, and the gearing between them is worm-gearing. In case bevel-gearing is used in that place instead of worm-gearing, the said shaft is located above the cutter-arbor, and the gearing may then be arranged on the plan shown in Fig. 22, which is a view from the same direction as Fig. 2. The shaft I—except for the gearing connecting it with the cutter-arbor and the blank-arbor, which may be removed as desired—may be driven independently of the other parts of the machine, and constitutes the source of power of the several mechanisms which are connected thereto, either directly or indirectly. It is immaterial to my invention whether the shaft I or the shaft B² is made such source of power, provided the gearing between them is such that the shaft that is so made may rotate the other. When the shaft B² is made the source of power, I prefer bevel-gearing between it and shaft I in place of the worm-gearing shown in the general views of my machine. By the expression "gearing between that shaft and the blank-arbor K²"—meaning from shaft B² or shaft I, as in claim 9—I include not only the gear-wheels and their pinions, but also any shafts by which those wheels and pinions may be carried, and similarly respecting those shafts—B² I—and the cutter-arbor.

The cutter-traversing mechanism consists of the following: In the front of frame B, between ways B⁷, are bearings in which a traverse-screw, N, is adapted to be revolved by hand-power by means of hand-wheel O, or by other motive power by means of a band applied to pulley M, which is driven by pulley J on shaft I, or by some other shaft or source of power—as, for instance, a separate counter-shaft. That traverse-screw is fitted to work in a nut (not shown) of the usual description, which is attached to the back side of carriage C, whereby the cutter-carrying mechanism is traversed on said ways B⁷. The pulley M is adapted to revolve freely upon N, and carries within it a sun-and-planet motion, of which the left-hand sun-wheel revolves freely about N, and has clutch-teeth upon its outer face, as shown, (see Fig. 8,) while the right-hand sun-wheel is splined to N, and has similar clutch-teeth upon its inner face, adapted to mesh with similar teeth on the right-hand face of the hub of pulley M. A fixed stud, Q, carries a reciprocating yoke, P, having two arms formed to encircle N, one on either side of the sun-and-planet motion. The left-hand arm has clutch-teeth upon its inner face, adapted to mesh with those of left-hand sun-wheel, and the right-hand arm engages with a groove of the right-hand sun-wheel. The proportion of these several parts is such that when the yoke P is thrown to the right hand, (see Figs. 2 and 8,) engaging with the left-hand sun-wheel, the sun-and-planet motion operates to impart a slow forward movement to N; but if the yoke is thrown to the left hand, engaging the clutch-teeth of the right-hand sun-wheel, which is splined to N directly with the hub of pulley M, then a more rapid backward movement is imparted to that traverse-screw. The construction of yoke P is such that when at rest in a central position neither of the clutches can operate, so that the traverse-screw may then be turned in either direction by means of wheel O. The slow forward movement is for feeding the cutter during the operation of cutting a tooth of a spur-wheel, and the more rapid backward movement is for withdrawing the cutter preparatory to rotating the blank to the position required for cutting another tooth.

For the purpose of imparting the required reciprocating motion to yoke P, there is placed below screw N, parallel therewith, an oscillating shaft, R, which has a handle (see Fig. 2) for operating said yoke by hand, and a rapidly-pitched screw-thread fitting a corresponding nut in P, whereby the said oscillating motion of R is converted into reciprocating motion and communicated in that form to the said yoke. The shaft R projects through its bearing at the rear side of the machine, and has a crank, M', thereon, upon which the spring R' operates, by means of the rod Q' and pivot-stud S', through said shaft and crank, to hold either one of the described clutches into gear when such one of them is placed in that position. In order to render this traverse-motion automatic, in the manufacture of spur-wheels, to the extent of withdrawing the cutter from the blank after a tooth has been cut therein, a reversing device is provided therefor, consisting of the following: The shaft R is splined throughout that part of its length between its bearings, and a gear, N⁵, is fitted to slide thereon. A bearing, B⁵, for supporting that gear and keeping it in a fixed relation to carriage C, is attached to the rear edge of said carriage. A vertically-reciprocating rack, I′, (see Figs. 8 and 9,) is secured upon that bearing—or upon the carriage itself, if preferred—meshing with gear N⁵, and having upon its rear edge a stud, J′, which is acted upon by the adjustably-fixed stops K′ and L′.

In the crank M′ (see Figs. 10, 11, and 12) is formed a notch, O′, and a spring or other suitable detent, as P′, is provided to catch into the same to hold shaft R in its central position. (Shown in Fig. 10.) A guard-plate, W′, is fitted to swing upon shaft R next to crank M′ between two pins, V′, fixed in the disk-shaped part of that crank.

As before described, the clutches operated by yoke P and shaft R are adapted to have three positions, according to whether the carriage C is at rest or having a forward or a backward motion. Therefore the detent device has three corresponding positions, which are shown, respectively, in Fig. 10 in the central, in Fig. 11 in the forward, and in Fig. 12 in the backward position.

Figure 10:
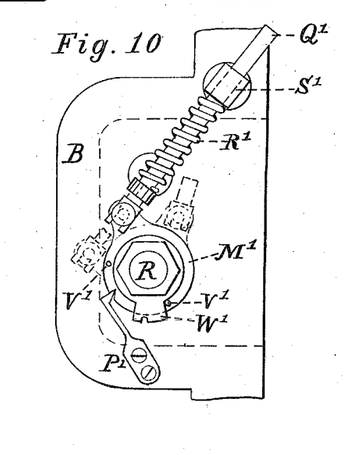
Figs. 10, 11, and 12 are views of the left-hand end of the parts shown in Fig. 8, showing the detent device of the cutter-traversing mechanism in three positions.
Figure 11:
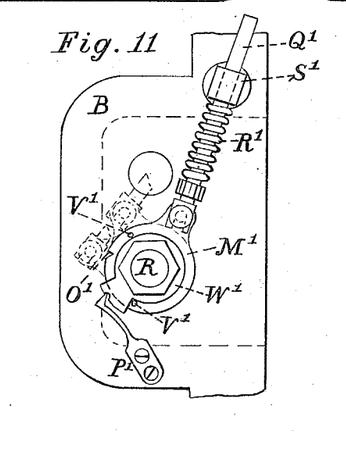
Figure 12:
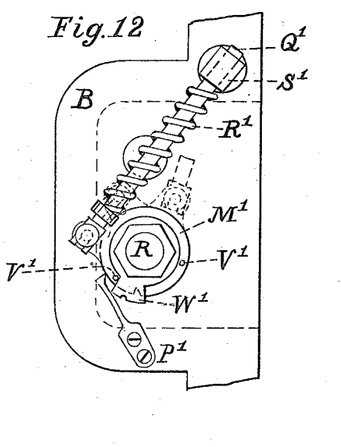

When the operator of the machine—the detent device being as in Fig. 10—has traversed the cutter to a proper point to begin a cut on the blank, he then starts the traverse mechanism forward by throwing the shaft R into the position shown in Fig. 11. By that operation the lower pin V′ pushes the guard-plate W′ under the detent P′, so that the said detent is held away from that surface of the crank M′ in which is formed the notch O′. The forward motion of carriage C thus started then continues until rack I′ is so far lifted up by stop K′ that by turning the gear N⁵ it throws the shaft R so far toward the position thereof shown in Fig. 11 that the spring R′ can act to continue that motion to the position shown in Fig. 12. During the latter part of that movement of R, after the notch O′ has passed the point of the detent P′, the upper pin V′ strikes the guard-plate W′, pushing it out from under the said detent, letting the latter rest upon the surface of the crank, as shown. The throwing of shaft R from its position in Fig. 10 to that in Fig. 12 by engaging the right-hand clutch reverses the motion of carriage C, giving to it the more rapid backward movement to withdraw the cutter from the blank, as will be obvious from the construction and arrangement of the parts of this mechanism, as hereinbefore described. When that backward motion has continued a sufficient distance, the rack I′ is pushed downward by stop L′, placed suitably therefor, until the shaft R is thrown from its position in Fig. 12 to its position in Fig. 10, when the detent drops into the notch O′, thereby detaining this whole mechanism at rest in that position until the operator sets it to repeat the described operations.

Figure 14:
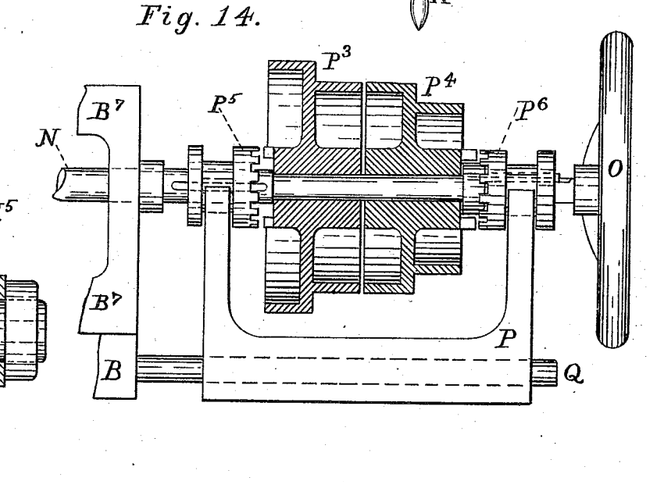

I do not limit myself to a sun-and-planet motion for producing, in combination with the other parts, the reversely-operating motions described. In Fig. 14 I have shown one suitable substitute therefor. The yoke P in this case engages with two clutches, P⁵ P⁶, one on either side of the pair of reversely-driven pulleys—or gears—P³ P⁴, which are placed in the position occupied by pulley M in Fig. 8. The operation of this device to perform the same function in the cutter-traversing mechanism as the described sun-and-planet motion is evident from the drawings, as well as a matter of common knowledge to those familiar with similar classes of machinery, and hence requires no special description. Instead of two clutches splined to the said traversing screw, a single double-faced clutch may be splined to that screw between said pulleys, which are then reversed on the screw, so as to operate substantially the same as either of the preceding arrangements.

Figure 8:
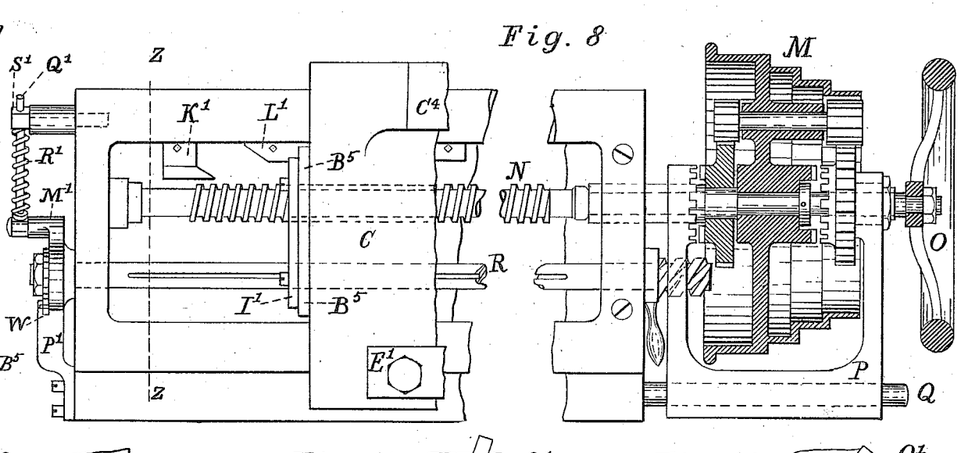
Fig. 8 is an enlarged view of a part of Fig. 2, showing the cutter-traversing mechanism.
Figure 9:
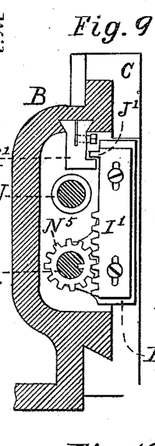
Fig. 9 is a vertical section in line $z\, z$ of Fig. 8.
Figure 15:
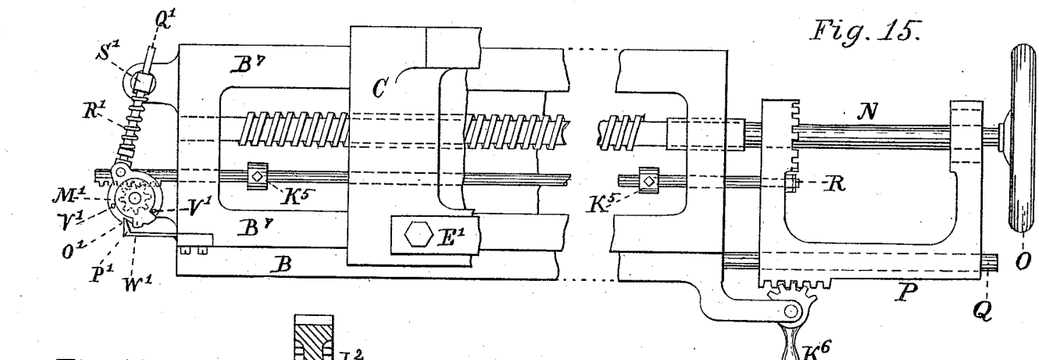

Fig. 15 shows a modification of the device for reversing the motion of the traversing screw N. The shaft R, for operating the clutches, which is adapted to have an oscillating motion, as shown in Fig. 8, has in this case a longitudinally-reciprocating motion. It is operated from the carriage C by means of stops K⁵, and by hand by means of any convenient device—as, for instance, the handle K⁶. The position of the detent device may then be changed from its position as shown in Fig. 8, so as to operate the rod R by means of any convenient connection—as, for instance, a rack and pinion, as shown in Fig. 15, or by means of a connecting-rod.

Instead of an auxiliary mechanism for traversing the cutter-carrying mechanism by means of a screw and nut, as hereinbefore described, one may be used having a rack-and-pinion movement, which may be made to operate automatically, either in one or in both directions, by suitable means. One such means for that purpose is the device described in United States Patent No. 13,813, dated November 20, 1855, to which reference may be had.

When the spur-wheel or worm-wheel blanks to be cut in this machine are not sufficiently rigid to properly withstand the side pressure of the cutter, it is necessary in this, as it has been heretofore in spur-gear-cutting machines, to provide a side support or rim-rest to resist that pressure. The said support consists in my present machine of the following: A slide, D, (see Figs. 1 and 2,) is adapted to be fixed upon ways B³ by means of binding-screws H³, and carries an adjustable bracket, I³, that is clamped in position by means of a screw, J³. That bracket carries a rest, K³, that is clamped thereto by a screw, L³, the said rest being adjustably fixed upon the said bracket by means of a screw, M³.

When a spur-wheel is to be cut in this machine, the blank therefor is first fixed to the blank-arbor $K^2$, a suitable cutter is fixed upon the cutter-arbor V and adjusted to its correct position relative to that blank, the clamp $C^3$ is tightened, and the blank-spacing mechanism properly adjusted to the requirements of the gear to be cut. The blank-carrying mechanism is then moved by means of the blank-feeding mechanism toward frame B far enough to allow the cutter to make a groove in the blank of a predetermined depth, the carriage E clamped to bed A by means of a binding-screw, $N^3$, and the bolts $M^2$ loosened. If the blank is such as to require a side support during the cutting operation, the rest $K^3$ is adjusted to come in contact with the left-hand side of the rim of the blank, and fixed in that position. The cutter-rotating mechanism is then put into operation by belting the pulley H to the source of power, and the cutter-traversing mechanism, heretofore at rest, as in Fig. 10, is set in operation in a forward direction, as hereinbefore described. When the cutter has finished its cut and been returned, automatically, or otherwise, as described, to its former position, the clamp $C^3$ is loosened, the spur-wheel blank turned the predetermined amount by means of the blank-spacing mechanism, the clamp $C^3$ is again tightened, and the blank-traversing mechanism again set in motion, as before. These operations being continued until that spur-wheel is completed, it is removed and the machine set for the same or other use, as required.

Whenever the machine is not required to be in immediate readiness for cutting worm-wheels, the worm-wheel $A^2$ may be removed from shaft $B^2$, thereby avoiding the wear of the same, and loss of power consequent upon running the entire blank-rotating mechanism when it is not in use.

When a worm-wheel is to be cut in this machine, the blank is similarly fixed to the blank-arbor $K^2$ as in the case of cutting a spur-wheel, the spur-pinion $N^2$ is thrown out of gear with the master-wheel $L^2$, the bolts $M^2$ are tightened, and the clamp $C^3$ and binding-screw $N^3$ are loosened. A hob of suitable size and pitch is fixed on the cutter-arbor and adjusted to a proper position relative to the blank to be cut. The reversing device of the cutter-traversing mechanism is thrown into its central positions—the band upon pulley M being preferably removed—where it is allowed to remain while the machine is in use for this purpose. The gearing of the blank-rotating mechanism is now adjusted by the placing of properly-proportioned gears $C^2$ and $G^2$ on the shafts $B^2$ and $H^2$, respectively, whereby the master worm-wheel $J^2$ is rotated at such a velocity, harmoniously with the rotation of cutter-arbor V, that the hob will traverse the periphery of the blank the same as the worm-pinion corresponding to that hob in pitch and size would, if in place thereof, traverse the periphery of the completed worm-wheel. The cutter-rotating mechanism is now set in motion, and the blank fed up to the cutter by revolving the screw $D^3$ until the hob—as $O^4$, Fig. 7—begins to cut the blank, when the graduated wheel $E^3$ is set at the zero-mark, as hereinbefore described. The feeding of the blank to the cutter may then be continued by turning that screw $D^3$ by hand, or by setting in operation the automatic part of the blank-feeding mechanism by engaging pawl $K^4$ with ratchet-wheel $R^2$. The machine is kept thus in operation until the teeth on the blank are made to a predetermined height, which may be known by means of the aforesaid graduated wheel E, when the blank-carrying mechanism is drawn away from the hob and the completed worm-wheel removed from the blank-arbor. By employing worm-gearing to rotate the cutter-arbor and the blank-arbor this important advantage is gained: The entire mechanism intermediate to those two arbors has, relatively thereto, a high rotative velocity, and therefore, even when of moderate relative dimensions, owing to the natural characteristics of such gearing, imparts a very steady and positive motion both to the cutter and to the blank. By this means large blanks are finished in a superior manner in a machine of but moderate size and strength.

In my claims to that part of my invention which consists in an organized machine I only limit the combinations to principal mechanisms, such as described herein; but I do not limit them to such auxiliary mechanisms described as adjunct to said principal ones, as those latter may be such as described, or any other that are substantially equivalent thereto, and have similar functions in the said combinations.

In my claims to that part of my invention which consists in the mechanisms organized into the said machine I only limit the combinations to the essential elements thereof; but I do not limit them to such parts or devices thereof as are merely auxiliary or adjunct to said essential ones, as these latter may be such as shown or described, or any other which are substantially equivalent thereto, and have similar functions in the said mechanisms.

I do not claim herein the special constructions of the mechanism illustrated by the several figures, 13 to 22, both inclusive, except in so far as the same may be specifically referred to in the claims, or may be equivalents for that which is shown in the previous figures 1 to 12, both inclusive, and duly claimed; but in so far as the same may embody patentable invention I intend them to form in part the subject-matter of separate applications.

Having thus described my invention I claim—

1. In a gear-cutting machine, in combination, a bed, as A, having ways, upon which a carriage, as E, is adapted to travel, the carriage E, a blank-carrying arbor carried upon said carriage, a master-wheel, as $J^2$, carried upon said arbor, and a splined shaft, as $H^2$, parallel to said ways, and carrying a pinion gearing with said master-wheel, substantially as and for the purpose described.

2. In a gear-cutting machine, in combination, a bed having a carriage, as E, adapted to travel thereon, a blank-carrying arbor upon said carriage, a master worm-wheel carried upon said arbor, a splined shaft parallel to said ways, and a worm-pinion carried in a bearing secured to said carriage, and adapted to slide upon said shaft and gear with said master-wheel, substantially as and for the purpose described.

3. In a gear-cutting machine, the combination consisting of the following three elements: first, a blank or cutter arbor, as K² or V, bored to receive the stem of a blank or cutter spindle; second, a blank or cutter spindle, as E⁴ or D′, having a stem adapted to fit the bore of said arbor; third, a screw, as O³ or C′, adapted to hold said spindle into said arbor, substantially as shown and described.

4. In a gear-cutting machine, the combination consisting of the following four elements: first, a hollow arbor, as K² or V; second, a spindle, as E⁴ or D′; third, a screw, as O³ or C′; fourth, a nut, as N⁴ or M⁴, whereby said screw may be made to force said spindle out of said arbor, substantially as described.

5. The carriage C, a slide, as W, means for adjusting and fastening said slide into said carriage, wheel T, notched to receive projections on clutch U, clutch U, having projections to enter the notches of said wheel, and spindle V, all combined and operating substantially as described.

6. The carriage C, the tubular slide W, means for adjusting and clamping said slide into said carriage, gear-wheel T, spindle V, and clutch mechanism between said wheel and said spindle, substantially as described.

7. In a gear-cutting machine, the combination consisting of the following five elements: first, a frame-work having ways, as B⁷; second, a carriage, as C, adapted to be traversed thereon; third, a cutter-arbor, as V, and a slide and clamp, substantially as described, whereby the same may be adjusted longitudinally of its axis and secured to said part C; fourth, a slotted shaft, as I, parallel to said ways B⁷; fifth, worm-gearing and clutch mechanism, substantially as described, connecting said shaft with said cutter-arbor.

8. The combination of the cutter-arbor V, gear-wheel T, collar U, and screw U′, substantially as and for the purpose described.

9. In a gear-cutting machine, the combination of the following five elements: first, a frame-work having ways for a carriage, E, and ways for a carriage, C, substantially as described; second, a carriage, as E, adapted to travel on the ways provided therefor, and carrying a blank-arbor, as K²; third, a carriage, as C, adapted to travel on the ways provided therefor, and carrying a suitable cutter-arbor; fourth, a shaft, as I, and gearing between that shaft and said cutter-arbor; fifth, a shaft, as B², and gearing between that shaft and shaft I and between that shaft and blank-arbor K².

10. In a gear-cutting machine, the combination of the following five elements: first, a frame-work having ways for a carriage, E, and ways for a carriage, C, substantially as described; second, a carriage, as E, adapted to travel on the ways provided therefor and carrying a blank-arbor, as K²; third, a carriage, as C, adapted to travel on the ways provided therefor, and carrying a suitable cutter-arbor; fourth, a shaft, as I, and worm-gearing between that shaft and said cutter-arbor; fifth, a shaft, as B², and gearing between that shaft and shaft I and between that shaft and blank-arbor K².

11. In a gear-cutting machine, the combination of the following five elements: first, a frame-work having ways for a carriage, E, and ways for a carriage, C, substantially as described; second, a carriage, as E, adapted to travel on the ways provided therefor, and carrying a blank-arbor, as K²; third, a carriage, as C, adapted to travel on the ways provided therefor, and carrying a suitable cutter-arbor; fourth, a shaft, as I, and gearing between that shaft and said cutter-arbor; fifth, a shaft, as B², and worm-gearing between that shaft and shaft I, and gearing between that shaft and arbor K².

12. In a gear-cutting machine, the combination of the following five elements: first, a frame-work having ways for a carriage, E, and ways for a carriage, C, substantially as described; second, a carriage, as E, adapted to travel on the ways provided therefor, and carrying a blank-arbor, as K²; third, a carriage, as C, adapted to travel on the ways provided therefor, and carrying a suitable cutter-arbor; fourth, a shaft, as I, and gearing between that shaft and said cutter-arbor; fifth, a shaft, as B², and gearing between that shaft and shaft I, and worm-gearing between that shaft and arbor K².

13. In a gear-cutting machine of the class described, the combination of the following four elements: first, a suitable frame-work, substantially as described, a cutter-arbor working thereon in an adjustable fixed position, and a blank-arbor adapted to be moved toward and from the said cutter-arbor; second, shaft B², and gearing, substantially as described, between that shaft and said cutter-arbor; third, shaft H², and gearing, substantially as described, between that shaft and said blank-arbor; fourth, suitable changeable gearing between said shaft B² and said shaft H², for the purpose described.

14. In a gear-cutting machine of the class described, the combination of the following four elements: first, a suitable frame-work, a cutter-arbor working thereon in an adjustable fixed position, and a blank-arbor adapted to be moved toward and from the said cutter-arbor; second, shaft B², and gearing, substantially as described, between that shaft and said cutter-arbor; third, shaft $H^2$, and gearing, substantially as described, between that shaft and said blank-arbor; fourth, a train of changeable spur-gearing between said shaft $B^2$ and said shaft $H^2$.

15. In a gear-cutting machine, a master-wheel and its blank-arbor, as $K^2$, supported in a movable bearing, in combination with a cutter-arbor working in an adjustable position in the machine, and intermediate connecting shafts and gearing, substantially as described, whereby the said blank-arbor and the said cutter-arbor are revolved harmoniously, for the purpose set forth.

16. In a gear-cutting machine, the combination of the hob and its arbor, an arbor upon a movable carriage for carrying the blank, intermediate connecting shafts and gearing adapted to rotate said blank harmoniously with said hob, and feed mechanism, substantially as described, whereby the blank is given to the hob by a positive feed.

17. In a gear-cutting machine, the combination of carriage E, arbor $K^2$, master-wheel $J^2$, pinion $I^2$, and bearing $I^4$, substantially as and for the purpose described.

18. In a gear-cutting machine, the combination of carriage E, arbor $K^2$, master worm-wheel $J^2$, worm-pinion $I^2$, and bearing $I^4$, substantially as and for the purpose described.

19. In a gear-cutting machine, in combination, the carriage E, screw $D^3$, arbor $K^2$, wheel $J^2$, pinion $I^2$, and shaft $H^2$, crank-motion $D^4$ or its equivalent, and the connections whereby said crank $D^4$ communicates rotary motion to $D^3$, for the purpose of feeding arbor $K^2$ toward the cutter, substantially as described.

20. The combination of the arbor V, having a projection, $A^4$, thereon, and bored to receive spindle D' and screw C', screw C' and spindle D' having a recess to receive said projection, and a threaded hole to receive said screw, substantially as and for the purpose described.

21. In combination, a suitable frame-work, as B, having ways for carriage C, carriage C, screw N, a reversely-operating mechanism adapted to slide said carriage on said ways by means of said screw, frame P, shaft R, pinion $N^5$, rack I', stops L' and K', and detent mechanism, all operating to cause and arrest the forward and the backward motions of carriage C, substantially as described.

22. The combination of the inclined plane K', the rack I', pinion $N^5$, the shaft R, and yoke P, all operating together to arrest the forward motion of carriage C, substantially as described.

23. The combination of the spring R', a rod and stud for supporting said spring to act upon crank M'. the crank M', shaft R, yoke P, and screw N, and the driving pulley or pulleys, all operating together to cause the backward motion of carriage C, substantially as described.

24. The combination of the inclined plane L', the rack I', pinion $N^5$, the shaft R, and the yoke P, all operating together to arrest the backward motion of carriage C, substantially as described.

25. The combination of the spring R', a rod and stud for supporting said spring to act upon crank M', the crank M', the detent P', shaft R, and yoke P, all operating together to keep the carriage C temporarily stationary upon ways B", substantially as described.

26. The combination of the spring R', a rod and stud for supporting said spring to act upon crank M', the crank M', the detent P', and guard-plate W', all operating together substantially as and for the purposes described.

In testimony whereof I hereunto set my hand this 31st day of October, 1883.

FRANCIS A. PRATT.

Witnesses:
   FRANCIS H. RICHARDS,
   GEO. A. REYNOLDS.